United States Patent Office 2,768,991
Patented Oct. 30, 1956

2,768,991

PREPARATION OF CATION EXCHANGERS FROM CO-POLYMERIZED CARBOXYLIC ACID AND CROSS-LINKING AGENT

Hermann Schnell, Leverkusen-Wiesdorf, and Wilhelm Becker and Otto Bayer, Leverkusen-Bayerwerk, Germany, assignors to Farbenfabriken Bayer Aktiengesellschaft, Leverkusen, Germany, a corporation of Germany No Drawing. Application April 1, 1952,
Serial No. 279,954

4 Claims. (Cl. 260—2.2)

The present invention relates to the production of cation-exchangers and to their use for the removal of cations from liquid media.

It is one object of our present invention to provide a process of preparing cation exchangers from water soluble polymerizable acids. A further object of our present invention are the cation-exchangers produced by this process.

It has already been proposed to use water in soluble acids or the water-soluble salts of such acids, which have been reduced by polymerization and cross-linkage of compounds containing ethylenic double bonds as cation-exchangers. These products have a high exchange capacity.

The cross-linkage of those polymerized acids has hitherto been effected after polymerization of the monomeric unsaturated acid, for instance acrylic acid, had taken place by secondary reactions, for instance by heating the polymerizates with appropriate compounds. It has also been proposed to effect the cross-linkage during the polymerization process by carrying out polymerization in the presence of water-insoluble polymerizable compounds containing a plurality of vinyl groups in their molecule, such as divinylbenzene.

According to the present invention especially valuable cation-exchangers are obtained by co-polymerizing water-soluble unsaturated polymerizable organic acids, preferably carboxylic acids, and/or their water-soluble salts, in admixture with water-soluble unsaturated compounds containing more than one polymerizable ethylene group in their molecule.

The medium in which this co-polymerization is carried out may contain as a solvent for the polymerizable compounds water or mixtures of water with organic solvents which are soluble in water such as ethyl alcohol.

The polymerization may be performed in the presence of various catalysts, for instance hydrogen peroxide, the salts of persulfuric acid. Especially appropriate catalysts are the so called "Redox"-systems, which are activating systems containing oxidizing and reducing substances such as, for instance, combinations of salts of the persulfuric acid with reducing agents containing sulfoxy groups, e. g. sodium bisulfite and formamidine sulfinic acid.

The co-polymerizates obtained by the process are completely homogeneous gels. The cross-linked insoluble copolymerizates may be separated from these gels by evaporating the water, by addition of electrolytes, by freezing out or by removing the water with an appropriate solvent.

The exchangers which are produced have a homogeneous and well-defined swelling capacity, the amount of which depends on the quantity of the water-soluble compounds effecting the cross-linkage during polymerization. They are pure white, hard, pulverizable substances having neither smell nor taste. They are not toxic at all and they are well compatible with the human organism, so that they may be used for therapeutic purposes, e. g. as a remedy against hyperacidity. On account of their swelling capacity they are also effective aperients.

Usaturated polymerizable water-soluble acids, which may be used as starting materials in the process are, for instance, acrylic acid and methacrylic acid. They may be used in combination with unsaturated acids, for instance fumaric acid, which by themselves are only difficultly polymerizable. For obtaining exchangers with particular swelling properties, part of the aforementioned unsaturated carboxylic acids may be replaced by other water-soluble unsaturated polymerizable compounds, for instance, acrylamide, methacrylamide and acrylonitrile.

Suitable water-soluble unsaturated polymerizable compounds containing more than one ethylene group in the molecule are for example the trimeric reaction product obtained from formalin and acrylonitrile (see Ballauf and Wegler, Chem. Ber. 81 (1948), p. 527 et seq.) of the following formula:

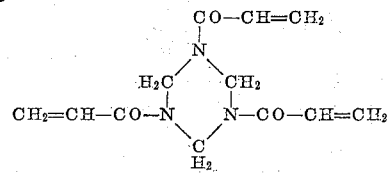

or the reaction products of polyamines with acrylic acid or methacrylic acid, for instance ethylene diacrylamide. The cross-linking agent may be used in an amount of 0.01 to 40 percent by weight of the total amount of polymerizable components.

The following examples are given to illustrate the invention. In these examples all parts are by weight.

Example 1

40 parts of NaOH dissolved in 100 parts of water are added to 90 parts of acrylic acid. 10 parts of the trimeric reaction product obtained from formaldehyde and acrylonitrile dissolved in 30 parts of a mixture of methanol and water (2:1) is added with stirring to the solution. The clear solution obtained is introduced together with nitrogen, while stirring, at 45° C. into a solution of 0.5 part of potassium persulfate and 0.35 part of formamidine sulfinic acid in 100 parts of water. After 48 minutes a gel is obtained, which gives off the greater part of its water when methanol is added. The white product obtained in this way is dried and pulverized. A pure white, odorless and tasteless powder is thus obtained. 65 cc. of n/10 HCl are required for neutralizing 1 gram of the reaction product. The swelling capacity of the product in water is 32 times its original volume, in 0.1 n HCl it is 6 times, and in a 0.25% solution of sodium bicarbonate it is 26 times its original volume. It is absolutely non-toxic and well compatible with the human organism. Therefore it may be used in medicine as a remedy against hyperacidity. In this connection the quick exchange of the sodium contained in the exchanger against hydrogen, which is a consequence of the swelling of the exchanger, is of advantage, as well as the fact that there cannot be produced an alkaline medium in the stomach by overdosage.

Example 2

388 parts of a 46.5% solution of acrylic acid in water are diluted by adding 700 parts of water. Thereafter 5 parts of the trimeric reaction product of formaldehyde and acrylonitrile are dissolved in the solution. It is then added to a solution of 1 part of potassium persulfate and 0.7 part of formamidine sulfinic acid in 100 parts of water while stirring and passing in nitrogen. After 60 minutes a gel is obtained which on drying forms a pure white, odorless and tasteless pulverizable product. The swelling capacity of the product in water is 48 times, in 0.1 n HCl it is 12 times, and in a 0.25% sodium bicarbonate solution it is 220 times its original volume. It is absolutely non-toxic and well compatible with the human organism even when administered in relatively large quantities. As the swelling capacity of the substance in an acid medium (stomach) is only slight and in a weakly alkaline medium (intestine) very high it is suitable for use in medicine as an aperient.

*Example 3*

24.810 parts of a 50.4 percent aqueous solution of acrylic acid are diluted with 25.800 parts of water. In this solution are dissolved 3.1 parts of the trimeric reactions product of acrylonitrile and formaldehyde. The resulting solution is added to a solution of 20.7 parts of potassium persulfate and 14.5 parts of formamidine sulfinic acid in 4000 parts of water while stirring the latter and passing nitrogen over it. After heating the solution at 35° C. for 5 hours a gel is obtained which is reduced to small pieces and dried at 70° C. The colorless powder thus obtained swells in water to form 80 times its original volume, in 0.1 n HCl 18 times, and in a 0.25 percent sodium bicarbonate solution 500 times its original volume. The product is insoluble in spite of its strong swelling capacity. Owing to its weak swelling capacity in the acid medium of the stomach and its high swelling capacity in the weakly alkaline medium of the intestines the product can successfully be used as an aperient.

We claim:

1. A process for the production of cation exchangers that are insoluble in water and have a high swelling capacity which comprises copolymerizing in the presence of a polymerization catalyst until a gel is formed an aqueous solution of at least one compound I selected from the group consisting of acrylic acid, methacrylic acid and their water soluble salts together with a cross-linking agent II selected from the group consisting of (1) ethylene diacrylamide and (2) the trimer obtained by reacting formalin with acrylonitrile, said polymerizable compounds I and II being dissolved in a solvent and said cross-linking agent being used in an amount of 0.01–40% by weight of the total amount of polymerizable compounds, separating the gel from the reaction mixture, drying the gel to form a pulverizable product, then pulverizing to a powder.

2. A process according to claim 1, wherein the cross-linking agent is the trimeric reaction product of acrylonitrile and formaldehyde.

3. A process according to claim 1, wherein the cross-linking agent is ethylene diacrylamide.

4. A process according to claim 1, wherein the polymerization catalyst is one comprising a Redox system.

References Cited in the file of this patent

UNITED STATES PATENTS

| | | |
|---|---|---|
| 2,340,111 | D'Alelio | Jan. 25, 1944 |
| 2,409,861 | Hunter et al. | Oct. 22, 1946 |
| 2,475,846 | Lundberg | July 12, 1949 |
| 2,527,300 | Dudley | Oct. 24, 1950 |
| 2,559,694 | Zerner | July 10, 1951 |
| 2,595,779 | Dudley | May 6, 1952 |
| 2,597,437 | Bodamer | May 20, 1952 |
| 2,643,958 | Kleiner et al. | June 30, 1953 |

FOREIGN PATENTS

| | | |
|---|---|---|
| 67,658 | Norway | Apr. 3, 1944 |